Feb. 1, 1944.   W. W. SLOANE   2,340,571
POWER TRANSMISSION DEVICE
Filed Dec. 13, 1941   5 Sheets-Sheet 4

INVENTOR.
William W. Sloane
BY
Clarence T. Poole
ATTORNEY

Patented Feb. 1, 1944

2,340,571

UNITED STATES PATENT OFFICE 2,340,571

POWER TRANSMISSION DEVICE

William W. Sloane, Chicago, Ill., assignor to Goodman Manufacturing Company, Chicago, Ill., a corporation of Illinois Application December 13, 1941, Serial No. 422,789

20 Claims. (Cl. 74—260)

This invention relates to improvements in power transmission devices and more particularly relates to an improved automatic power transmission device adapted to transmit power from a fluid motor to a turntable of a mining machine, for swinging the turntable at a slow cutting speed and a higher positioning speed, dependent upon the speed of rotation of said fluid motor.

With fluid motors of the type which are driven at one speed from a pump of one volumetric capacity and at a lower speed from a pump of a lower volumetric capacity, there is leakage of fluid when the motor is operating at the slow speed. This leakage increases as the speed of the motor decreases, with the result that it is not possible to operate the motor at a slow enough speed to feed the cutter bar across the coal face at the required cutting speed without the interposition of a plural speed gear reduction, which may be of a complicated construction.

The device of my present invention has as its principal objects to remedy this difficulty by providing a simplified form of automatic transmission in the drive between the fluid motor and the turntable and in so arranging this transmission that a reduction of speed of a driven member will be obtained when the motor is operating at a slow speed, and the driven member will be driven at the speed of rotation of the motor, when the motor is operating at higher speeds.

A more specific object of my invention is to provide a novel form of automatic transmission adapted to drive a driven member at a slower speed than the speed of the motor, when the motor is rotating at a slow speed, and to drive the driven member at the same speed as the speed of the motor, when the motor is rotating at a predetermined higher speed, and so arranged that the transmission will always go back to a slow speed when the motor stops, and the driven member will always be driven at a slower speed than the speed of the motor when the motor starts and until it reaches a predetermined higher speed.

Other objects of my invention will appear from time to time as the following specification proceeds and with reference to the accompanying drawings wherein:

Figure 9 is a transverse sectional view taken substantially along line 9—9 of Figure 5;

Figures 1, 2, 3:
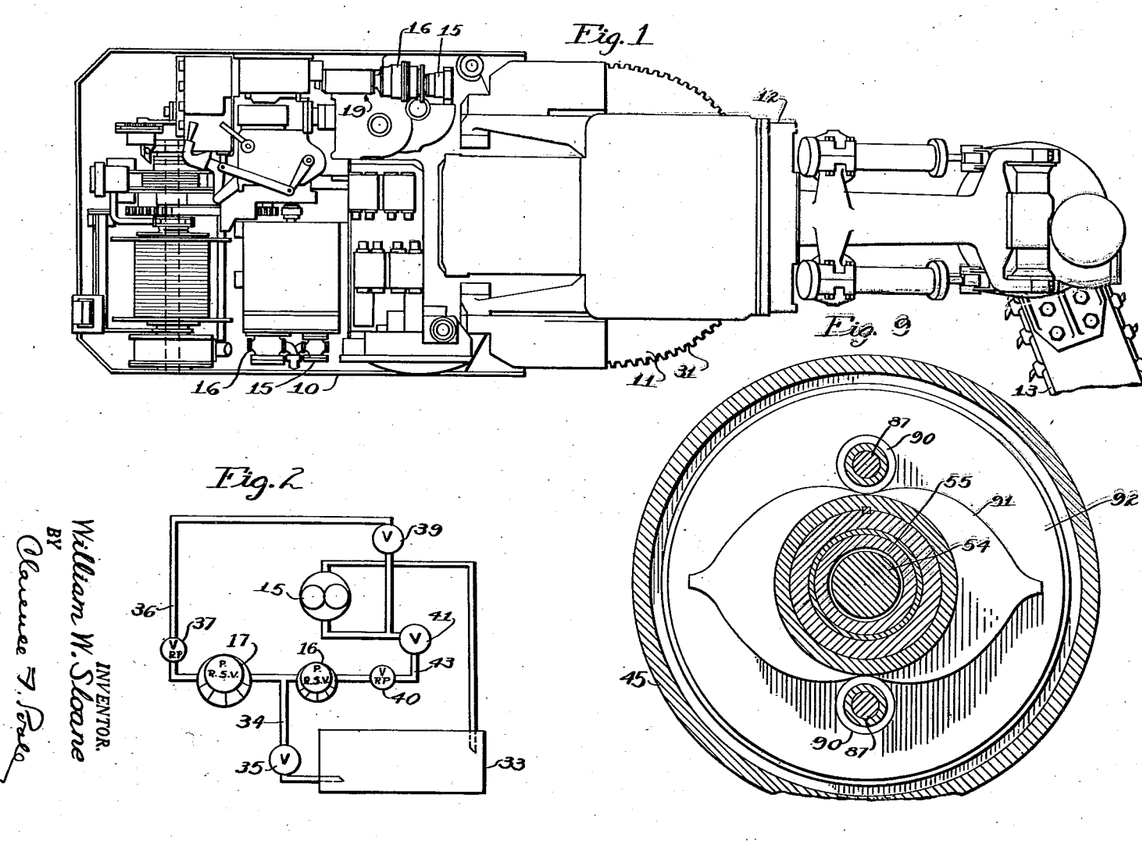
Figure 1 is a plan view of a mining machine of the track mounted type having a fluid drive and transmission mechanism constructed in accordance with my invention, associated therewith.
Figure 2 is a diagrammatic view showing the fluid connections for driving the fluid motor at either a low speed or at a plurality of predetermined higher speeds.
Figure 3 is a fragmentary plan view illustrating certain details of the drive to the turntable for the cutting machine.
Figure 3:
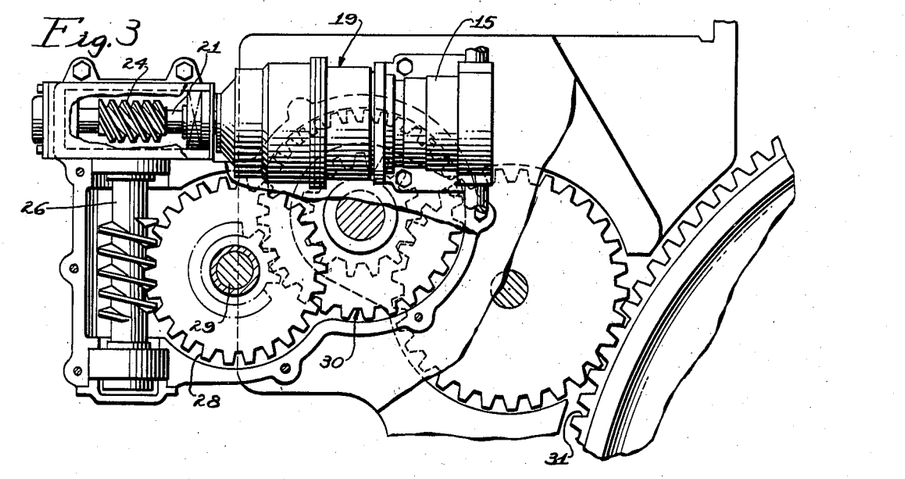

In the drawings, the embodiment of my invention illustrated is shown as driving a turntable 11 of a mining machine of the track mounted type, for laterally swinging said turntable. Said turntable forms a support for a cutting element 12 having a cutter chain carrying cutter bar 13 projecting therefrom, and is adapted to swing said cutter bar across the front end of the machine at either a slow feeding speed for cutting a kerf across the front end of the machine or a higher positioning speed. The mining machine is of a usual type of track mounted machine commonly known as a slabbing machine, and is no part of my present invention so will not herein be shown or described in detail.

The drive to the turntable includes a fluid motor 15 of a rotary type, adapted to be driven at a slow feeding speed by means of a fluid pump 16, at an intermediate positioning speed through a fluid pump 17, or at a higher positioning speed through both of said fluid pumps acting together. (See Figure 2.)

Figure 4:
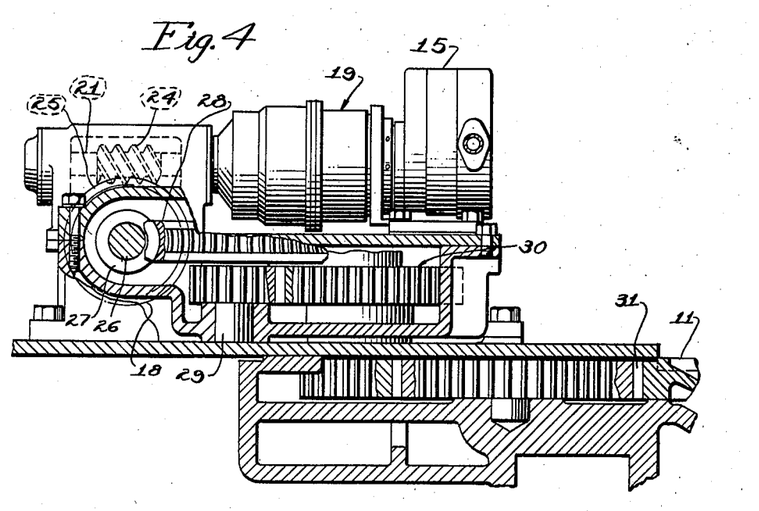
Figure 4 is a longitudinal sectional view illustrating certain other details of the drive to the turntable than are shown in Figure 3.

The fluid motor 15 has direct connection with a power transmission device 19 through its motor shaft, and said power transmission device in turn has driving connection with a longitudinal shaft 21, keyed to a cage 22 of a planetary geared reduction device 23, which forms a part of said power transmission device. The shaft 21 has a worm 24 formed integral therewith, which meshes with a worm gear 25 on a transverse shaft 26. A worm 27 on said shaft meshes with and drives a worm gear 28 on a vertical shaft 29. A spur gear reduction generally indicated by reference character 30 is provided to connect said vertical shaft with gear teeth 31, cut on the outer periphery of said turntable. (See Figures 3 and 4.)

The fluid connections to the pumps 16 and 17 include a fluid storage tank 33 and a conduit 34, leading therefrom and branching off to the intake sides of the pumps 16 and 17. A valve 35 is placed in said conduit to shut off the flow of fluid to said pumps, when desired. A conduit 36 leads from the pump 17 to the fluid motor 15. A pressure responsive release and check valve 37 is provided in said conduit and a control valve 39 is also provided in said conduit, to control the flow of fluid to the motor 15. A pressure responsive release and check valve 40 and a control valve 41 are provided in a conduit 43 leading from the pump 16 to the motor 15, to control the flow of fluid from said pump to said motor.

When the valves 39 and 41 are both open, the motor 15 will be driven by both of said pumps at a high rate of speed. When the valve 41 is open and the valve 39 is closed, the motor 15 will be driven by the pump 16 at a slow feeding speed, and when the valve 41 is closed and the valve 39 is open, said motor will be driven from the pump 17 at an intermediate speed.

Figure 5:
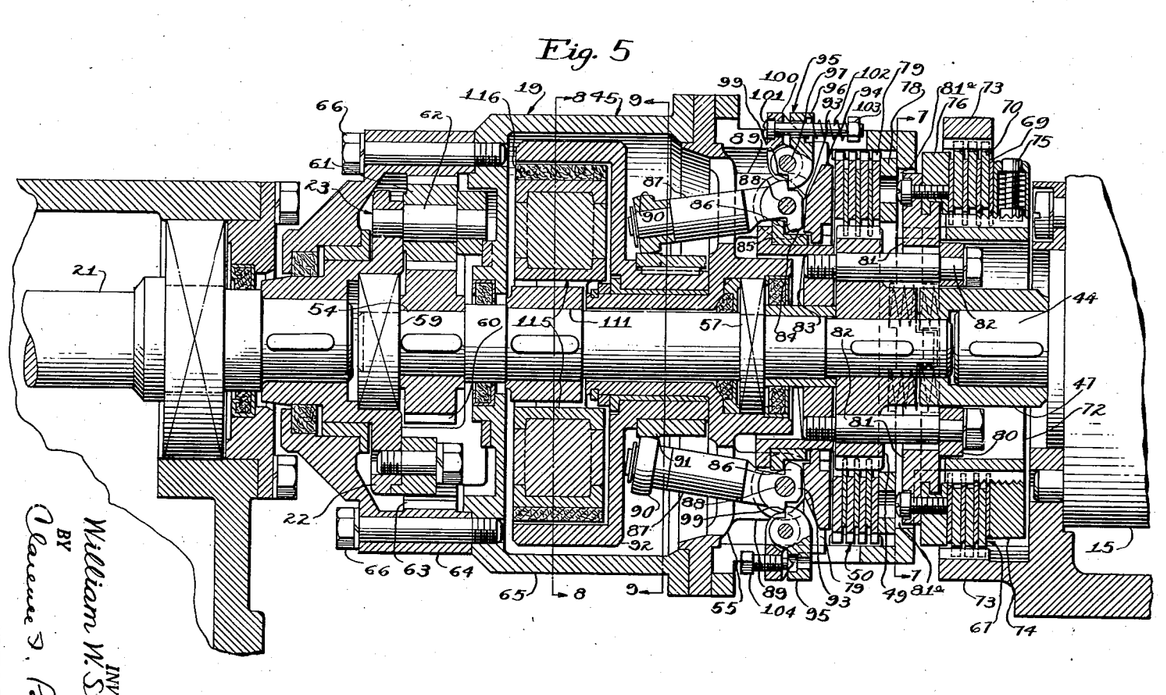
Figure 5 is a longitudinal sectional view taken through the automatic power transmisison device shown in Figure 1.
Figure 6:
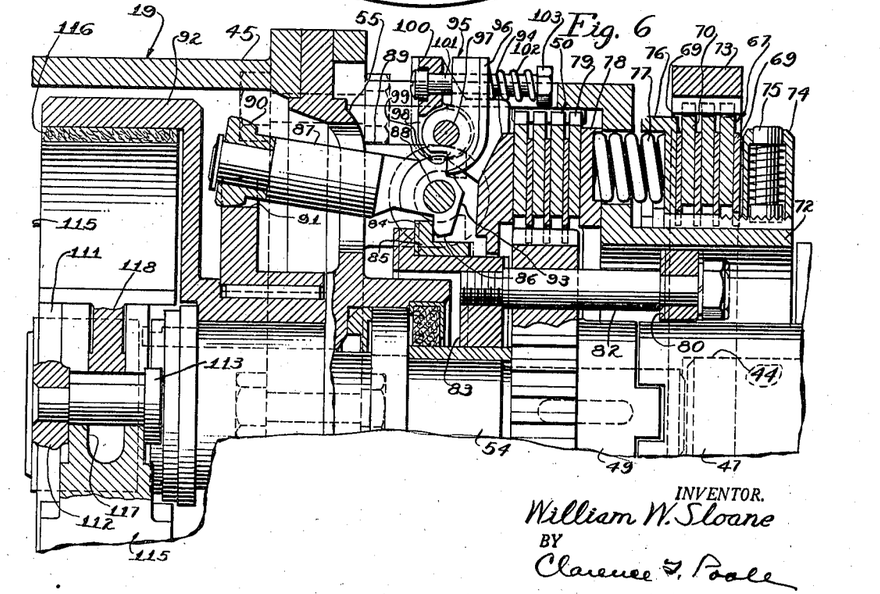
Figure 6 is an enlarged partial fragmentary detail sectional view, showing certain details of the transmission device not shown in Figure 5.

Referring now in particular to certain novel features of my invention and the details of the transmission device 19, a motor shaft 44 of the motor 15 extends within a casing 45 of the transmission device. A coupling member 47 is keyed to said shaft and has driving connection with an externally splined driving member 49 of a friction clutch 50, herein shown as being of a multiple disk type and forming a means for rotatably driving the casing 45 with said motor shaft, when the speed of rotation of said shaft reaches a certain predetermined value.

The driving member 49 is keyed on a longitudinally extending shaft 54 coaxial with the motor shaft 44, for driving said shaft. Said shaft is journaled adjacent its end next to said motor shaft, in a spider 55 of the casing 45, on a ball bearing 57. The opposite end of said shaft is journaled in a ball bearing 59 mounted in the cage 22 of the planetary geared reduction device 23. A spur pinion 60 is keyed on said shaft just inside of the ball bearing 59 and meshes with planetary pinions 61, 61, freely mounted on longitudinally extending shafts 62, 62, which shafts are mounted at their ends in the cage 22. Said planetary pinions mesh with an internal gear 63 on the inside of an end frame member 64 of the casing. Said end frame member is secured to an intermediate portion 65 of said casing by means of suitable cap screws 66, 66.

A suitable friction brake 67, herein shown as being a multiple disk type, is provided to hold the casing 45 from rotation. When said casing is held from rotation, the planetary pinions 61, 61 will be orbitally driven about the shaft 54 by means of the pinions 60, 60. This will rotatably drive the cage 22 and shaft 21 at a reduced speed.

When brake 67 is in a disengaged position, the casing 45 will be free to rotate. At the same time, the friction disk clutch 50 will be in an engaged position, to rotatably drive said casing with said shaft. This will drive the shaft 21 at the speed of rotation of the motor shaft 44, since the planetary pinions 61, 61 and the cage 22 will rotate as a unit with said casing, the shaft 54 rotating at the same speed as the shaft 44.

The holding brake 67 includes a plurality of alternately arranged abutting annular clutch disks 69 and 70. The disks 69, 69 are internally splined and the splined portions thereof have engagement with a splined outer periphery of a rear cylindrical portion 72 of the casing 45. The disks 70, 70 are externally splined and the splined portions thereof have engagement with an internally splined portion of a stationary annular frame member 73, for holding said disks from rotation. A retaining and adjusting nut 74 is threaded on said splined cylindrical portion and abuts the outer end disk 69. A spring pressed locking pin 75 is provided to lock said nut from rotation and has engagement with the splines of said cylindrical portion. The opposite end disk 69 is abutted by an annular engaging member 76, which has a plurality of compression springs 77, 77 seated therein. Said springs serve to engage the disks 69 and 70 with each other and the ends of said springs opposite from said engaging member are seated within an annular ring 78, abutting an end friction disk 79 of the friction clutch 50.

A shifting ring 80 is mounted within the cylindrical portion 72 and is adapted to engage inwardly extending members 81, 81, secured to and extending inwardly from the engaging member 76 through slots 81a, 81a formed in the rear portion 72 of the casing 45. Said shifting ring is adapted to move said engaging member against the springs 77, 77 and to permit disengagement of the brake 67 and free rotation of the casing 45.

The means for shifting said ring and the brake 67 to a released position includes a plurality of threaded pins 82, 82 secured to said ring and extending therefrom through the driving member 49 of the clutch 50 and slidably movable with respect to said driving member. The ends of said pins opposite from said ring are threaded within a shifting member 83. Said shifting member, as herein shown, is encircled by a flanged ring 84 which abuts a shouldered inner portion 85 thereof. Said flanged ring is engaged by depending projections 86, 86 of diametrically opposite pivoted shifting arms 87, 87, which arms are pivotally mounted on the spider 55, for movement about parallel spaced transverse axes disposed closely adjacent said depending projections.

Figures 7, 11:
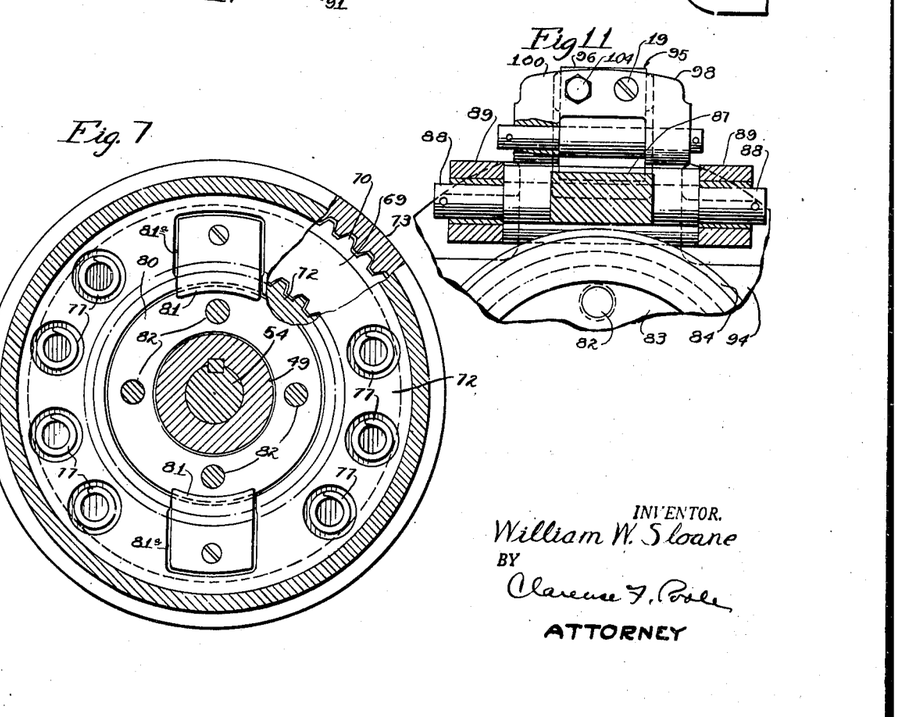
Figure 7 is a transverse sectional view taken substantially along line 7—7 of Figure 5.
Figure 11 is an enlarged partial fragmentary detail view showing certain details of the clutch shifting mechanism in transverse section.
Figure 10:
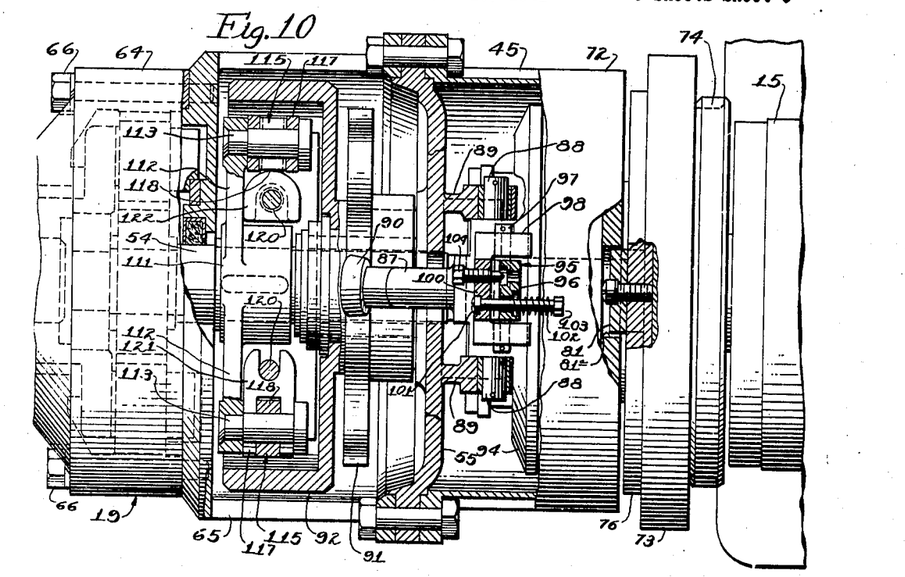
Figure 10 is an enlarged detail plan view of the transmission device, with certain parts broken away and certain other parts shown in horizontal section.

The shifting arms 87, 87, as herein shown, each have a pair of laterally spaced, oppositely disposed, transversely extending, integrally formed projecting pins 88, 88. Said pins form a pivotal mounting for said arms and are journaled in ears 89, 89, projecting rearwardly from the spider 55 (see Figures 10 and 11). The ends of said shifting arms opposite from said pivotal pins have rollers 90, 90 mounted thereon, which engage and ride along opposite similar surfaces of an operating cam 91, keyed to the hub of a drum 92 (see Figures 5, 9 and 10). Thus, as said cam moves relatively with respect to said shifting arms in one direction, it will pivot said arms outwardly, to move the shifting member 83 in a direction to permit disengagement of the disks 69 and 70.

The springs 77, 77, besides engaging the disks 69, 69 with the disks 70, 70, also serve to return said arms and the cam 91 to a neutral position as shown in Figures 5 and 9, through the ring 80, pins 82, 82 and shifting member 83, as soon as the speed of rotation of the motor is reduced below a certain predetermined speed. The mechanism for moving said cam relatively with respect to said arms will hereinafter be more fully explained as this specification proceeds.

The friction clutch 50 is also moved to an engaged position by means of the shifting arms 87, 87 to cause the casing 45 to rotate with the shaft 44. Said arms are provided with rear engaging surfaces 93, 93, adapted to engage an annular engaging ring 94, abutting an end disk 79 of said clutch. As said arms are moved in an upward direction by the cam 91, to disengage the holding brake 67, the engaging surfaces 93, 93 of said arms will engage and move said annular ring in a direction to engage the friction clutch 50 in an obvious manner.

The friction clutch 50 is adjusted by means of a pair of adjusting members 95, 95. Each of said members is associated with a shifting arm 87 and is of a similar construction, so only one of said members will herein be described in detail. Each adjusting member 95 includes a pivoted member 96 mounted on a pivotal pin 97 between the furcations of a bracket 98, projecting inwardly and upwardly from and formed integrally with the annular engaging ring 94.

The member 96 depends from the pin 97 and is notched at 99. Said notched portion engages an upper notched portion of the shifting arm 87. The bracket 98 has an upwardly projecting portion 100, through which extends a bolt 101. A spring 102 encircles said bolt and is interposed between a nut 103 on the end thereof and the member 96, to yieldably hold the notch 99 in engagement with the shifting arm 87. An adjusting screw 104 is threaded in the upwardly projecting portion 100 and is engageable with said pivoted member 96, to adjust the clearance between the annular engaging member 94 and the end clutch plate 79.

Referring now to the means for operating the cam 88 and pivotally moving the shifting arms 87, 87 in an upward direction, to engage the clutch 50 and disengage the holding brake 67, a member 111 is keyed on the longitudinal shaft 54, within the limits of the drum 92. Said member has two oppositely extending arms 112, 112 having pivotal pins 113, 113, mounted in the free ends thereof and extending in a direction parallel to the shaft 54, towards the inside of said drum. A pair of oppositely disposed weighted members 115, 115 are slidably mounted on said pins, for movement away from the center of the shaft 54. Said weighted members have arcuate outer faces with friction engaging shoes 116, 116, mounted on the outer surface thereof, which are adapted to have engagement with the inner periphery of the drum 92, for rotatably driving said drum and the cam 91. As herein shown, one end of each of said weighted members is bifurcated as is indicated by reference character 117. The furcations of said bifurcated end each have open slots formed therein which have slidable engagement with one of the pins 113. An end 118 of each weighted member, opposite from said bifurcated portion, is also slotted and extends between the furcations of the bifurcated end 117 of the opposite weighted member, and slidably engages one of the pins 113. Opposite ends of said weighted members thus have interleaving engagement with each other, and said members are mounted on the pins 113, 113 for movement away from said shaft 54, upon rotation thereof.

Figure 8:
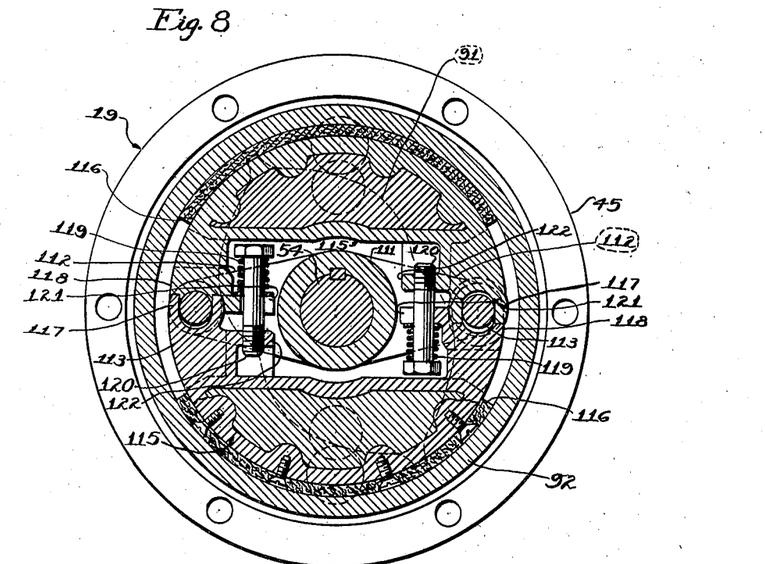
Figure 8 is a transverse sectional view taken substantially along line 8—8 of Figure 5.

Preloaded compression springs 119, 119 are provided to hold said weighted members in an inward position with respect to said shaft until said shaft reaches a predetermined speed. Each of said springs encircles a cap screw 120 and is interposed between the head thereof and a lug 121 extending inwardly of one weighted member 115, adjacent one end thereof. Each cap screw extends through a slotted portion of said lug and has threaded engagement with a lug 122, projecting inwardly from the opposite weighted member (see Figure 8).

During rotation of the shaft 54 at a slow speed, the springs 119, 119 will hold said weighted members in an inward position with respect to said shaft, and hold the friction shoes 116, 116 from engagement with the inside of the drum 92. As the speed of rotation of said shaft increases, said weighted members will be centrifugally thrown outwardly from the center thereof against said springs, to engage said shoes with the inner periphery of said drum and to drive said drum at the speed of rotation of said shaft.

As a predetermined load is placed on the driven shaft 21, the cam 91 will move with respect to the casing 45. This will cause the rollers 90, 90 to ride outwardly along opposite surfaces of said cam and will pivot the shifting arms 87, 87 in an outward direction to engage the engaging portion 93, 93 thereof with the annular engaging member 94, and move said member in a direction to engage the friction clutch 50. At the same time, the depending arms 86, 86 will engage the flanged ring 84 and move said ring in a direction to permit release of the holding brake 67. The clutch 50 being in an engaged position and the holding brake 67 being in a disengaged position, the casing 45 will be rotatably driven by said clutch 50 at the speed of rotation of the motor shaft 44, and the shaft 21 will be driven at the same rate of speed as the shaft 44. As the speed of rotation of the motor 20 decreases, the springs 119, 119 will move the weighted members 115, 115 towards the shaft 54 to disengage the friction shoes 116 from the drum 92. At this time the springs 77, 77 will move the engaging member 76 and ring 80 in a direction to engage the holding brake 67 and hold the casing 45 from rotation. Movement of said ring in this direction will also move the flanged ring 84 in the same direction, to pivot the shifting arms 87, 87 in a counterclockwise direction. This will pivot the cam 91 to the neutral position shown in Figures 5 and 9. Thus, each time the motor 15 stops, or whenever said motor is rotating below a predetermined speed, the casing 45 will be held from rotation and the shaft 21 will be driven at a reduced speed through the planetary gear carrier 23.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a hydraulic power transmission device, a fluid motor having a motor shaft, means for supplying fluid to said motor at different volumes, to control the speed of rotation thereof, a driven shaft, and reduction means interposed between said motor shaft and said driven shaft and automatically operable when said motor is rotating at a slow speed, for reducing the speed of rotation of said driven shaft, and for automatically increasing the speed of rotation of said driven shaft, to the speed of said motor shaft, as said motor is driven at a higher speed including a planetary unit, a reaction member for said planetary unit, and means responsive to the speed of rotation of said motor, for holding said reaction member from rotation, while said motor is rotating at a slow speed, and for permitting said reaction member to freely rotate as the speed of said motor increases, said speed responsive means including a driving member rotatably driven by said motor at the speed of rotation thereof, a pair of friction shoes rotatably driven by said driving member, a driven member adapted to be engaged by said shoes and driven thereby, means operated by said driven member upon rotation thereof, for holding said reaction member from rotation, and means responsive to centrifugal force for engaging said shoes with said driven member.

2. In a hydraulic power transmission device, a fluid motor having a motor shaft, means for supplying fluid to said motor at different volumes, to control the speed of rotation thereof, a driven shaft, and reduction means interposed between said motor shaft and said driven shaft and automatically operable when said motor is rotating at a slow speed, for reducing the speed of rotation of said driven shaft, and for automatically increasing the speed of rotation of said driven shaft to the speed of said motor shaft, as said motor is driven at a higher speed including a planetary unit, a reaction member for said planetary unit, and means responsive to the speed of rotation of said motor, for holding said reaction member from rotation, while said motor is rotating at a slow speed, and for permitting said reaction member to freely rotate as the speed of said motor increases, said speed responsive means including a driving member rotatably driven by said motor at the speed of rotation thereof, a pair of friction shoes rotatably driven by said driving member, a driven member adapted to be engaged by said shoes and driven thereby, means operated by said driven member upon rotation thereof, for holding said reaction member from rotation, and means responsive to centrifugal force, for engaging said shoes with said driven member including a pair of opposed weights having said friction shoes mounted thereon.

3. In a power transmission device, a fluid motor, means for supplying fluid under pressure to said motor at different volumes, to cause said motor to rotate at different speeds, a driven shaft, planetary reduction means connecting said motor with said driven shaft, means automatically operable to drive said driven shaft at the speed of said motor when said motor is rotating at a predetermined high speed, and to drive said driven shaft through said planetary reduction means when said motor is rotating at a predetermined low speed including a reaction member for said planetary means, a friction device operable to hold said reaction member from rotation when said motor rotates at a slow speed, another friction device operable to rotate said reaction member with said motor when said motor rotates at a high speed, and means dependent upon the speed of rotation of said motor for releasing said first mentioned friction device and applying said second mentioned friction device as the speed of rotation of said motor increases including a drum, a pair of friction shoes adapted to engage said drum by centrifugal action to rotate said drum with the shaft of said motor, and means operated by said drum, upon rotation thereof, for applying said second mentioned friction device and releasing said first mentioned friction device.

4. In a power transmission device, a fluid motor, means for supplying fluid under pressure to said motor at different volumes, to cause said motor to rotate at different speeds, a driven shaft, planetary reduction means connecting said motor with said driven shaft, means automatically operable to drive said driven shaft at the speed of said motor, when said motor is rotating at a predetermined high speed and to drive said driven shaft through said planetary reduction means when said motor is rotating at a predetermined low speed including a reaction member for said planetary means, a friction device operable to hold said reaction member from rotation when said motor rotates at a slow speed, another friction device operable to rotate said reaction member with said motor when said motor rotates at a high speed, means dependent upon the speed of rotation of said motor for releasing said first mentioned friction device and applying said second mentioned friction device as the speed of rotation of said motor increases including a drum, a pair of friction shoes adapted to be engaged with said drum by centrifugal action, to rotate said drum with the shaft of said motor, and means operated by said drum, upon rotation thereof, for applying said second mentioned friction device and releasing said first mentioned friction device including a cam rotatably driven by said drum, a roller engaging said cam, a pivoted lever arm having said roller mounted thereon and pivotally mounted adjacent its end opposite from said roller, and a member engaged by said arm for applying said second mentioned friction device as said roller rides outwardly along said cam.

5. In a power transmission device, a fluid motor having a motor shaft, means for supplying fluid under pressure to said motor at different volumes, to cause said motor to rotate at different speeds, a driven shaft, planetary reduction means connecting said motor with said driven shaft, means automatically operable to drive said driven shaft at the speed of said motor, when said motor is rotating at a predetermined high speed and to drive said driven shaft through said planetary means when said motor is rotating at a predetermined low speed including a reaction member for said planetary means, a friction device operable to hold said reaction member from rotation when said motor rotates at a slow speed, another friction device operable to rotate said reaction member with said motor when said motor rotates at a high speed, and means dependent upon the speed of rotation of said motor for releasing said first mentioned friction device and applying said second mentioned friction device as the speed of rotation of said motor increases including a drum, a pair of friction shoes adapted to be engaged with said drum by centrifugal action, to rotate said drum with said motor shaft, and means operated by said drum upon rotation thereof, to apply said second mentioned friction device and to release said first mentioned friction device including a cam rotatably driven by said drum, a pair of rollers engaging said cam, a pair of pivoted lever arms, each of said arms having one of said rollers mounted thereon and being pivoted adjacent their ends opposite from said rollers, a member engaged by said arms for applying said second mentioned friction device as said rollers ride outwardly along said cam surfaces, and another member engaged by said lever arms, for releasing said first mentioned friction device as said second mentioned friction device is applied.

6. In a power transmission device, a fluid motor having a motor shaft, means for supplying fluid under pressure to said motor at different volumes, to cause said motor to rotate at different speeds, a driven shaft, planetary reduction means connecting said motor with said driven shaft, means automatically operable to drive said driven shaft at the speed of said motor, when said motor is rotating at a predetermined high speed and to drive said driven shaft through said planetary means when said motor operates at a predetermined low speed including a reaction member for said planetary means, a friction device operable to hold said reaction member from rotation when said motor rotates at a slow speed, another friction device operable to cause said reaction member to rotate with said motor when said motor rotates at a high speed, and means dependent upon the speed of rotation of said motor for releasing said first mentioned friction device and applying said second mentioned friction device as the speed of rotation of said motor increases including a drum, a pair of friction shoes adapted to be engaged with said drum by centrifugal action, to rotate said drum with said motor shaft, and means operated by said drum upon rotation thereof, to apply said second mentioned friction device and to release said first mentioned friction device including a cam rotatably driven by said drum, a pivoted lever arm, a roller mounted on said arm adjacent one end thereof and engaging said cam, a member engaged by said arm for applying said second mentioned friction device as said roller rides outwardly along the surface of said cam, and yieldable means for returning said lever arm and cam to a neutral position as the speed of said motor decreases.

7. In a power transmission device, a fluid motor having a motor shaft, means for supplying fluid under pressure to said motor at different volumes, to cause said motor to rotate at different speeds, a driven shaft, a planetary reduction means connecting said motor with said driven shaft, and means automatically operable to drive said driven shaft at the speed of said motor, when said motor is rotating at a predetermined high speed and to drive said driven shaft through said planetary means when said motor operates at a predetermined low speed including a reaction member for said planetary means, a friction device operable to hold said reaction member from rotation when said motor rotates at a slow speed, another friction device operable to cause said reaction member to rotate with said motor when said motor rotates at a high speed, and means dependent upon the speed of rotation of said motor for releasing said first mentioned friction device and applying said second mentioned friction device as the speed of rotation of said motor increases including a drum, a member within said drum and rotatably driven at the speed of rotation of said motor shaft, a pair of friction shoes slidably mounted on said member for movement away from the axis of rotation thereof and engageable with the inner periphery of said drum, for rotatably driving said drum, and means operated by said drum upon rotation thereof, for applying said second mentioned friction device and releasing said first mentioned friction device and for holding said friction devices in such positions as long as said motor rotates at a predetermined high speed.

8. In a power transmission device, a fluid motor having a motor shaft, means for supplying fluid under pressure to said motor at different volumes, to cause said motor to rotate at different speeds, a driven shaft, planetary reduction means connecting said motor with said driven shaft, and means automatically operable to drive said driven shaft at the speed of said motor, when said motor is rotating at a predetermined high speed and to drive said driven shaft through said planetary means when said motor operates at a predetermined low speed including a reaction member for said planetary means, a friction device operable to hold said reaction member from rotation when said motor rotates at a slow speed, another friction device operable to cause said reaction member to rotate with said motor when said motor rotates at a high speed, and means dependent upon the speed of rotation of said motor, for releasing said first mentioned friction device and applying said second mentioned friction device as the speed of rotation of said motor increases to a predetermined rate including a drum, a member within said drum and rotatably driven at the speed of rotation of said motor shaft, a pair of friction shoes slidably mounted on said member for movement away from the axis of rotation thereof, and engageable with the inner periphery of said drum for rotatably driving said drum, means operated by said drum upon rotation thereof, for applying said second mentioned friction device and releasing said first mentioned friction device and for holding said friction devices in such positions as long as said motor rotates at a predetermined high speed including a cam, a pivoted arm, and operative connections from said arm to said friction devices.

9. In a power transmission device, a fluid motor having a motor shaft, means for supplying fluid under pressure to said motor at different volumes, to cause said motor to rotate at different speeds, a driven shaft, planetary reduction means connecting said motor with said driven shaft, and means automatically operable to drive said driven shaft at the speed of said motor, when said motor is rotating at a predetermined high speed and to drive said driven shaft through said planetary means when said motor operates at a predetermined low speed including a reaction member for said planetary means, a friction device operable to hold said reaction member from rotation when said motor rotates at a slow speed, another friction device operable to cause said reaction member to rotate with said motor when said motor rotates at a high speed, and means dependent upon the speed of rotation of said motor, for releasing said first mentioned friction device and applying said second mentioned friction device as the speed of rotation of said motor increases to a predetermined rate including a drum, a member within said drum and rotatably driven at the speed of rotation of said motor shaft, a pair or friction shoes slidably mounted on said member for movement away from the axis of rotation thereof, and engageable with the inner periphery of said drum for rotatably driving said drum, means operated by said drum upon rotation thereof, for applying said second mentioned friction device and releasing said first mentioned friction device and for holding said friction devices in such positions as long as said motor rotates at a predetermined high speed including a cam, a pair of pivoted arms having operative connection with said friction devices and adapted to be pivoted by said cam in a direction to apply said second mentioned friction device and to release said first mentioned friction device, and said cam and arms being so arranged that said arms will return said cam to a neutral position as the speed of said motor reaches a predetermined low speed.

10. In a power transmission device, a fluid motor having a motor shaft, means for supplying fluid under pressure to said motor at different volumes, to cause said motor to rotate at different speeds, a driven shaft, planetary reduction means connecting said motor with said driven shaft, and means automatically operable to drive said driven shaft at the speed of said motor, when said motor is rotating at a predetermined high speed and to drive said driven shaft through said planetary means when said motor operates at a predetermined low speed including a reaction member for said planetary means, a friction device operable to hold said reaction member from rotation when said motor rotates at a slow speed, another friction device operable to cause said reaction member to rotate with said motor when said motor rotates at a high speed, and means dependent upon the speed of rotation of said motor, for releasing said first mentioned friction device and applying said second mentioned friction device as the speed of rotation of said motor increases to a predetermined rate including a drum, a member within said drum and rotatably driven at the speed of rotation of said motor shaft, a pair of friction shoes slidably mounted on said member for movement away from the axis of rotation thereof, and engageable with the inner periphery of said drum for rotatably driving said drum, means operated by said drum upon rotation thereof, for applying said second mentioned friction device and releasing said first mentioned friction device and for holding said friction devices in such positions as long as said motor rotates at a predetermined high speed including a cam, a pair of pivoted arms having operative connection with said friction devices and adapted to be pivoted by said cam in a direction to apply said second mentioned friction device and release said first mentioned friction device, a plurality of springs for applying said first mentioned friction device, said springs being adapted to return said arms and cam to a neutral position as the speed of said motor reaches a predetermined low speed.

11. In a hydraulic power transmission device, a fluid motor, means for supplying fluid under pressure to said motor at different volumes, to drive said motor at different speeds, a motor shaft, a driven shaft, and means to compensate for the loss of power of said motor caused by leakage of fluid as said motor is driven at a slow speed, said means being automatically operable to cause said motor shaft to drive said driven shaft at a lower speed than the speed of said motor shaft, when said motor is driven at a slow speed, and being automatically operable to drive said driven member at the speed of said motor shaft as the speed of said motor increases to a predetermined value, and including planetary geared reduction means interposed between said motor shaft and said driven shaft, a reaction member for said planetary geared reduction means, a brake to hold said reaction member from rotation, a clutch to drive said reaction member with said motor shaft, a centrifugal clutch, and means operable upon engagement of said centrifugal clutch to apply said friction clutch and release said brake, to cause said reaction member to be driven at the speed of said motor shaft as the speed of rotation of said motor reaches a predetermined value.

12. In a hydraulic power transmission device, a fluid motor, means for supplying fluid under pressure to said motor at different volumes, to drive said motor at different speeds, a motor shaft, a driven shaft, means to compensate for the loss of power of said motor caused by leakage of fluid as said motor is driven at a slow speed, said means being automatically operable to cause said motor shaft to drive said driven shaft at a lower speed than the speed of said motor shaft, when said motor is driven at a slow speed, and being automatically operable to drive said driven member at the speed of said motor shaft as the speed of said motor increases to a predetermined value, and including planetary geared reduction means interposed between said motor shaft and said driven shaft, a reaction member for said planetary geared reduction means, a brake to hold said reaction member from rotation, a clutch to drive said reaction member with said motor shaft, a centrifugal clutch, and means operable upon engagement of said centrifugal clutch to apply said friction clutch and release said brake, to cause said reaction member to be driven at the speed of said motor shaft as the speed of rotation of said motor reaches a predetermined value including a cam operated by said centrifugal clutch, and means operated by said cam for engaging said friction clutch and releasing said brake.

13. In a hydraulic power transmission device, a fluid motor, means for supplying fluid under pressure to said motor at different volumes, to drive said motor at different speeds, a motor shaft, a driven shaft, means to compensate for the loss of power of said motor caused by leakage of fluid as said motor is driven at a slow speed, said means being automatically operable to cause said motor shaft to drive said driven shaft at a lower speed than the speed of said motor shaft, when said motor is driven at a slow speed, and being automatically operable to drive said driven member at the speed of said motor shaft as the speed of said motor increases to a predetermined value, and including planetary geared reduction means interposed between said motor shaft and said driven shaft, a reaction member for said planetary geared reduction means, a brake to hold said reaction member from rotation, a clutch to drive said reaction member with said motor shaft, a centrifugal clutch, and means operable upon engagement of said centrifugal clutch, to apply said friction clutch and release said brake, to cause said reaction member to be driven at the speed of said motor shaft, as the speed of rotation of said motor reaches a predetermined value including a cam operated by said centrifugal clutch, a spring for applying said brake, and means operated by said cam for releasing said brake against said spring and for applying said friction clutch.

14. In a hydraulic power transmission device, a fluid motor, means for supplying fluid under pressure to said motor at different volumes, to drive said motor at different speeds, a motor shaft, a driven shaft, and means to compensate for the loss of power of said motor caused by leakage of fluid as said motor is driven at a slow speed, said means being automatically operable to cause said motor shaft to drive said driven shaft at a lower speed than the speed of said motor shaft, when said motor is driven at a slow speed, and being automatically operable to drive said driven member at the speed of said motor shaft, as the speed of said motor increases to a predetermined value, and including planetary geared reduction means interposed between said motor shaft and said driven shaft, a reaction member for said planetary geared reduction means, a brake to hold said reaction member from rotation, a clutch to drive said reaction member with said motor shaft, a centrifugal clutch, and means operable upon engagement of said centrifugal clutch, to apply said friction clutch and release said brake, to cause said reaction member to be driven at the speed of said motor shaft, as the speed of rotation of said motor reaches a predetermined value including a cam operated by said centrifugal clutch, a spring for applying said brake, and a rocking arm operated by said cam, for releasing said brake and applying said friction clutch.

15. In a hydraulic power transmission device, a fluid motor, means for supplying fluid under pressure to said motor at different volumes, to drive said motor at different speeds, a motor shaft, a driven shaft, and means to compensate for the loss of power of said motor caused by leakage of fluid as said motor is driven at a slow speed, said means being automatically operable to cause said motor shaft to drive said driven shaft at a lower speed than the speed of said motor shaft, when said motor is driven at a slow speed, and being automatically operable to drive said driven member at the speed of said motor shaft as the speed of said motor increases to a predetermined value, and including planetary geared reduction means interposed between said motor shaft and said driven shaft, a reaction member for said planetary geared reduction means, a brake to hold said reaction member from rotation, a clutch to drive said reaction member with said motor shaft, a centrifugal clutch, and means operable upon engagement of said centrifugal clutch to apply said friction clutch and release said brake, to cause said reaction member to be driven at the speed of said motor shaft as the speed of rotation of said motor reaches a predetermined value including a cam operated by said centrifugal clutch, a spring for applying said brake, a rocking arm operated by said cam for releasing said brake against said spring and for applying said friction clutch, said cam and rocking arm being so arranged that said spring for applying said brake will move said cam to a neutral position through said rocking arm upon the reduction in speed of said motor below a predetermined value.

16. In a power transmission device, a motor having a motor shaft, a driven shaft, and reduction means interposed between said motor shaft and said driven shaft and automatically operable when said motor is rotating at a slow speed for reducing the speed of rotation of said driven shaft below the speed of rotation of said motor shaft, and automatically operable when said motor is rotating at a higher speed, to increase the speed of rotation of said driven shaft to the speed of said motor shaft, and including a planetary unit having a reaction member, means for holding said reaction member from rotation, while said motor is rotating at a slow speed, and means responsive to the speed of rotation of said motor, for rotating said reaction member with said motor shaft as the speed of said motor increases, said means including a driving member rotatably driven by said motor at the speed of rotation thereof, a driven member, a centrifugal clutch for driving said driven member from said driving member, as the speed of rotation of said motor increases to a predetermined value, and means operated by said driven member upon rotation thereof for rotatably driving said reaction member at the speed of rotation of said motor shaft when said motor rotates at a predetermined high speed including a friction clutch interposed between said motor shaft and said reaction member, and cam means operated by said driven member for applying said friction clutch, to drive said reaction member with said motor shaft.

17. In a power transmission device, a motor having a motor shaft, a driven shaft, and reduction means interposed between said motor shaft and said driven shaft and automatically operable when said motor is rotating at a slow speed for reducing the speed of rotation of said driven shaft below the speed of rotation of said motor shaft, and automatically operable when said motor is rotating at a higher speed, to increase the speed of rotation of said driven shaft to the speed of said motor shaft, and including a planetary unit having a reaction member, means for holding said reaction member from rotation, while said motor is rotating at a slow speed, and means responsive to the speed of rotation of said motor, for rotating said reaction member with said motor shaft as the speed of said motor increases, said means including a driving member rotatably driven by said motor at the speed of rotation thereof, a driven member, a centrifugal clutch for driving said driven member from said driving member as the speed of rotation of said motor increases to a predetermined value, and means operated by said driven member upon rotation thereof, for rotatably driving said reaction member at the speed of rotation of said motor shaft when said motor rotates at a predetermined high speed including a friction clutch interposed between said motor shaft and said reaction member, a cam rotatably driven by said driven member, and a rocking arm having engagement with said cam and rocked thereby, for applying said friction clutch.

18. In a power transmission device, a motor having a motor shaft, a driven shaft, and reduction means interposed between said motor shaft and said driven shaft and automatically operable when said motor is rotating at a slow speed for reducing the speed of rotation of said driven shaft below the speed of rotation of said motor shaft, and automatically operable when said motor is rotating at a higher speed, to increase the speed of rotation of said driven shaft to the speed of said motor shaft, and including a planetary unit having a reaction member, a brake for holding said reaction member from rotation, a friction clutch for driving said reaction member with said motor shaft, and means responsive to the speed of rotation of said motor shaft, for applying said clutch and releasing said brake, for rotating said reaction member with said motor shaft as the speed of said motor shaft increases to a predetermined value including a centrifugal clutch and mechanism operated by said centrifugal clutch, for applying said friction clutch and releasing said brake, and driving said driven shaft through said reaction member at the speed of said motor shaft.

19. In a power transmission device, a motor having a motor shaft, a driven shaft, and reduction means interposed between said motor shaft and said driven shaft and automatically operable when said motor is rotating at a slow speed for reducing the speed of rotation of said driven shaft below the speed of rotation of said motor shaft, and automatically operable when said motor is rotating at a higher speed to increase the speed of rotation of said driven shaft to the speed of said motor shaft, including a planetary unit having a reaction member, a brake for holding said reaction member from rotation, a friction clutch for rotating said reaction member with said motor shaft, and means responsive to the speed of rotation of said motor shaft for applying said clutch and releasing said brake, for rotating said reaction member with said motor shaft, as the speed of said motor shaft increases to a predetermined value including a centrifugal clutch and mechanism operated by said centrifugal clutch, for applying said friction clutch and releasing said brake, including a cam rotatably driven by said driven member, and an operative connection from said cam to said clutch and said brake.

20. In a power transmission device, a motor having a motor shaft, a driven shaft, and reduction means interposed between said motor shaft and said driven shaft and automatically operable when said motor is rotating at a slow speed for reducing the speed of rotation of said driven shaft below the speed of rotation of said motor shaft, and automatically operable when said motor is rotating at a higher speed to increase the speed of rotation of said driven shaft to the speed of said motor shaft, including a planetary unit having a reaction member, a brake for holding said reaction member from rotation, a friction clutch for rotating said reaction member with said motor shaft, and means responsive to the speed of rotation of said motor shaft for applying said clutch and releasing said brake for rotating said reaction member with said motor shaft, as the speed of said motor shaft increases to a predetermined value including a centrifugal clutch and mechanism operated by said centrifugal clutch for applying said friction clutch and releasing said brake, including a cam rotatably driven by said driven member, an operative connection from said cam to said clutch and said brake, and yieldable means for applying said brake, said yieldable means being adapted to return said cam to a neutral position through said operative connection to said clutch and said brake.

WILLIAM W. SLOANE.